US011853716B2

(12) United States Patent
Van Benthem et al.

(10) Patent No.: US 11,853,716 B2
(45) Date of Patent: *Dec. 26, 2023

(54) SYSTEM AND METHOD FOR ROUNDING RECIPROCAL SQUARE ROOT RESULTS OF INPUT FLOATING POINT NUMBERS

(71) Applicant: Imagination Technologies Limited, Kings Langley (GB)

(72) Inventors: Casper Van Benthem, Abbots Langley (GB); Sam Elliott, London (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,676

(22) Filed: Nov. 30, 2021

(65) Prior Publication Data

US 2022/0091819 A1 Mar. 24, 2022

Related U.S. Application Data

(63) Continuation of application No. 15/293,541, filed on Oct. 14, 2016, now Pat. No. 11,294,625.

(30) Foreign Application Priority Data

Oct. 19, 2015 (GB) ...................................... 1518478

(51) Int. Cl.
    *G06F 7/483* (2006.01)
    *G06F 7/499* (2006.01)
    *G06F 7/552* (2006.01)

(52) U.S. Cl.
    CPC .......... *G06F 7/483* (2013.01); *G06F 7/49947* (2013.01); *G06F 7/49963* (2013.01);
    (Continued)

(58) Field of Classification Search
    CPC .. G06F 7/5525; G06F 7/49963; G06F 7/5443; G06F 2207/5521; G06F 2207/5526–5528
    (Continued)

(56) References Cited

U.S. PATENT DOCUMENTS 5,671,170 A   9/1997 Markstein et al.
6,625,632 B1  9/2003 Kotlov
(Continued)

OTHER PUBLICATIONS

J.L. Hennessy et al., Computer architecture: A quantitative approach, Elsevier Science & Technology, Appendix A1, 2014 (Year: 2014).*
(Continued)

*Primary Examiner* — Emily E Larocque
(74) *Attorney, Agent, or Firm* — Potomac Law Group, PLLC; Vincent M DeLuca

(57) ABSTRACT

Methods and systems for determining whether an infinitely precise result of a reciprocal square root operation performed on an input floating point number is greater than a particular number in a first floating point precision. The method includes calculating the square of the particular number in a second lower floating point precision; calculating an error in the calculated square due to the second floating point precision; calculating a first delta value in the first floating point precision by calculating the square multiplied by the input floating point number less one; calculating a second delta value by calculating the error multiplied by the input floating point number plus the first delta value; and outputting an indication of whether the infinitely precise result of the reciprocal square root operation is greater than the particular number based on the second delta term.

6 Claims, 10 Drawing Sheets

(52) U.S. Cl.
CPC ............ *G06F 7/552* (2013.01); *G06F 7/5525* (2013.01); *G06F 2207/5521* (2013.01)

(58) Field of Classification Search
USPC ................................................ 708/605, 497
See application file for complete search history.

(56) References Cited

U.S. PATENT DOCUMENTS

| 6,996,596 | B1 | 2/2006 | Ho et al. |
| 9,612,800 | B2 | 4/2017 | Rarick |
| 2005/0027772 | A1 | 2/2005 | Enenkel et al. |

OTHER PUBLICATIONS

Lang et al. "Radix-4 Reciprocal Square-Root and Its Combination with Division and Square Root" IEEE Transactions on Computers, Sep. 2003, pp. 1100-1114.

Piso et al. "A New Rounding Method Based on Parallel Remainder Estimation for Goldschmidt and Newton-Raphson Algorithms"17th Euromicro Conference on Digital System Design, 2729 Aug. 2014, pp. 639-642.

Butts et al. "Radix-8 digit-by-rounding: Achieving High-Performance Reciprocals, Square Roots, and Reciprocal Square Roots" Proceedings of the 20th IEEE Symposium on Computer Arithmetic (ARITH 2011) , pp. 149-158.

Jeannerod et al. "Optimizing Correctly-Rounded Reciprocal Square Roots for Embedded VLIW Cores" 43rd Asilomar Conference on Signals, Systems and Computers pp. 731-735.

Dinechin et al., "Multiplicative Square Root Algorithms for FPGAs," 2010 Int'l Conference on Field Programmable Logic and Applications, IEEE Computer Society, 2010, pp. 574-577.

Karp et al., "High-Precision Division and Square Root," ACM Transactions on Mathematical Software, vol. 23, No. 4, Dec. 1997, pp. 561-589.

Markstein, "Computation of Elementary Functions on the IBM RISC System/6000 Processor," IBM J. Res. Develop., vol. 34, No. 1, Jan. 1990.

Markstein; "IA-64 and Elementary Functions"; Speed and Precision; Chapter 9 Square Root; Jan. 1, 2000; pp. 135-149.

Jordache et al., "On Infinitely Precise Rounding for Division, Square Root, Reciprocal and Square Root Reciprocal," Proceedings 14th IEEE Symposium on Computer Arithmetic; Apr. 14, 1999; pp. 233-240.

Ercegovac et al., "Reciprocation, Square Root, Inverse Square Root, and Some Elementary Functions Using Small Multipliers," IEEE Transactions on Computers, IEEE Service Center; vol. 49, No. 7; Jul. 1, 2000; pp. 628-636.

(Note: NPL in parent application).

* cited by examiner

SYSTEM AND METHOD FOR ROUNDING RECIPROCAL SQUARE ROOT RESULTS OF INPUT FLOATING POINT NUMBERS

CROSS-REFERENCE TO RELATED APPLICATIONS AND CLAIM OF PRIORITY

This application is a continuation under 35 U.S.C. 120 of copending application Ser. No. 15/293,541 filed Oct. 14, 2016, which claims foreign priority under 35 U.S.C. 119 from United Kingdom Application No. 1518478.1 filed Oct. 19, 2015.

BACKGROUND

When an arithmetic operation is performed in hardware it is performed using a specific number representation, such as, but not limited to, a fixed point number representation or a floating point number representation. As is known to those skilled in the art a fixed point number representation has a fixed number of digits after the radix point (e.g. decimal point or binary point). In contrast, a floating point number representation does not have a fixed radix point (i.e. it can "float"). In other words the radix point can be placed anywhere within the representation.

The most common floating point standard is the Institute of Electrical and Electronics Engineers (IEEE) standard for floating-point arithmetic (IEEE-754). IEEE-754 specifies that floating point numbers are represented by three numbers: sign, exponent and mantissa (s, exp, mant). In general the three numbers (s, exp, mant) are interpreted, for a fixed integer bias, as shown in equation (1):

$$(-1)^s 2^{exp-bias} 1.\text{mant} \quad (1)$$

IEEE-754 defines the four basic formats shown in Table 1 for floating point numbers with varying degrees of precision. In particular, they are encoded with 16, 32, 64 and 128 bits respectively.

TABLE 1

| Type | Name | Sign Width | Exponent Width (ew) | Mantissa Width (mw) | Bias $2^{ew-1} - 1$ | Roundoff Error (u) |
|---|---|---|---|---|---|---|
| Half | F16 | 1 | 5 | 10 | 15 | $2^{-11}$ |
| Single | F32 | 1 | 8 | 23 | 127 | $2^{-24}$ |
| Double | F64 | 1 | 11 | 52 | 1023 | $2^{-53}$ |
| Quad | F128 | 1 | 15 | 112 | 16383 | $2^{-113}$ |

Floating point representations allow a greater range of numbers for the same number of bits (compared to fixed point number). Accordingly, both very large integers and small fractional numbers can be represented using the same floating point representation. However, since floating point numbers only have a limited number of bits they are prone to rounding errors. In particular, if the binary width of the exponent and mantissa are ew and mw respectively the number of bits of precision or significant bits is mw+1 (the floating point format has an implied bit of precision). The roundoff error u is half the distance between 1 and the next representable floating point value.

When a "round to nearest" rounding mode is used, the output of a floating point arithmetic operation is ideally the nearest representable value in the output format (i.e. output precision) to the infinitely precise result, y. In other words, ideally the output has been correctly rounded (up or down) to the nearest representable value. To reduce the compounding effect of rounding errors when performing multiple operations in sequence, and allow accurate decision making for the final rounding step, some floating point arithmetic operation hardware implementations are configured to compute intermediate results in a precision that is higher than the final output precision, and then round the result to the nearest representable number in the output precision. The extra bits in the intermediate precision may be referred to as guard bits. For example, the output values may be double precision 64-bit with 67-bit floating point intermediate values (i.e. with three guard bits).

Such hardware can produce a calculated result $y_c$ in the intermediate precision that is quite close to the infinitely precise result y. In particular, by choosing the number of guard bits appropriately, it can be possible to obtain a calculated result $y_c$ in the intermediate precision which is of sufficient accuracy to ensure that the infinitely precise result y can be accurately rounded to one of the two consecutive representable numbers of the lower output precision above and below the calculated result $y_c$.

For example, FIG. 1 shows four consecutive representable numbers i, j, k and l in the lower output precision. If the calculated result in the intermediate precision $y_c$ lies between j and k, by choosing the number of guard bits appropriately, it can be possible to ensure that that infinitely precise result y must fall in the region 102 defined by the half way number $y_{h-kl}$ between k and l and the half way number $y_{h-ij}$ between i and j. If the infinitely precise result y lies in this region 102 then the infinitely precise result y can be correctly rounded to one of j and k.

This means that in many cases rounding the calculated result $y_c$ to the output precision will produce the same result as rounding the infinitely precise result y to the output precision. However, there is still an error between the calculated result $y_c$ and the infinitely precise result y that may cause $y_c$ and y to be on different sides of the half-way number $y_h$ (the number that is half way between the two consecutive representable numbers in the output precision on either side of $y_c$) when y is close to the half-way number $y_h$ resulting in $y_c$ and y being rounded differently. In particular, in some cases y may be rounded up whereas $y_c$ may be rounded down and vice versa.

For example, FIG. 2 shows two consecutive representable numbers j and k in the output precision where j is smaller than k. The half way number between j and k, $y_h$, is shown as a dotted line. Where the calculated result $y_c$ in the intermediate precision is greater than the half way number $y_h$ and the infinitely precise result y is less than the half way number $y_h$ as shown in FIG. 2, the output should be rounded down to j in the output precision however since $y_c$ is above the half way number, $y_c$ will be incorrectly rounded up to k. Such a rounding error can be problematic in some applications.

The embodiments described below are provided by way of example only and are not limiting of implementations which solve any or all of the disadvantages of known methods and systems for accurately rounding the output of floating point arithmetic operations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and systems for determining whether an infinitely precise result of a reciprocal square root operation performed on an input floating point number is greater than a particular number in a first floating point precision. The method includes calculating the square of the particular number in a second lower floating point precision; calculating an error in the calculated square due to the second floating point precision; calculating a first delta value in the first floating point precision by calculating the square multiplied by the input floating point number less one; calculating a second delta value by calculating the error multiplied by the input floating point number plus the first delta value; and outputting an indication of whether the infinitely precise result of the reciprocal square root operation is greater than the particular number based on the second delta term.

A first aspect provides a system configured to determine whether an infinitely precise result of a reciprocal square root operation performed on an input floating point number is greater than, less than, or equal to a particular number in a first floating point precision, the computer system comprising: one or more multiply add logic units configured to: calculate a square of the particular number in a second floating point precision that is less than the first floating point precision; calculate a rounding error in the calculated square; calculate a first delta value in the first floating point precision by calculating the square multiplied by the input floating point number less one; and calculate a second delta value in the first floating point precision by calculating the rounding error multiplied by the input floating point number plus the first delta value; and an output module configured to output an indication of whether the infinitely precise result of the reciprocal square root operation is greater than, less than or equal to the particular number based on the second delta value.

A second aspect provides a computer-implemented method of determining whether an infinitely precise result of a reciprocal square root operation performed on an input floating point number is greater than, less than, or equal to a particular number in a first floating point precision, the method comprising: calculating a square of the particular number in a second floating point precision that is less than the first floating point precision; calculating a rounding error in the calculated square; calculating a first delta value in the first floating point precision by calculating the square multiplied by the input floating point number less one; and calculating a second delta value in the first floating point precision by calculating the rounding error multiplied by the input floating point number plus the first delta value; and outputting an indication of whether the infinitely precise result of the reciprocal square root operation is greater than, less than or equal to the particular number based on the second delta value.

A third aspect provides computer readable storage medium having stored thereon computer readable instructions that, when processed at a computer system for generating a manifestation of an integrated circuit, cause the computer system to generate a manifestation of a system according to the first aspect.

A fourth aspect provides computer readable code adapted to perform the steps of the method of the second aspect when the code is run on a computer.

A fifth aspect provides computer readable storage medium having encoded thereon the computer readable code of the fourth aspect.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
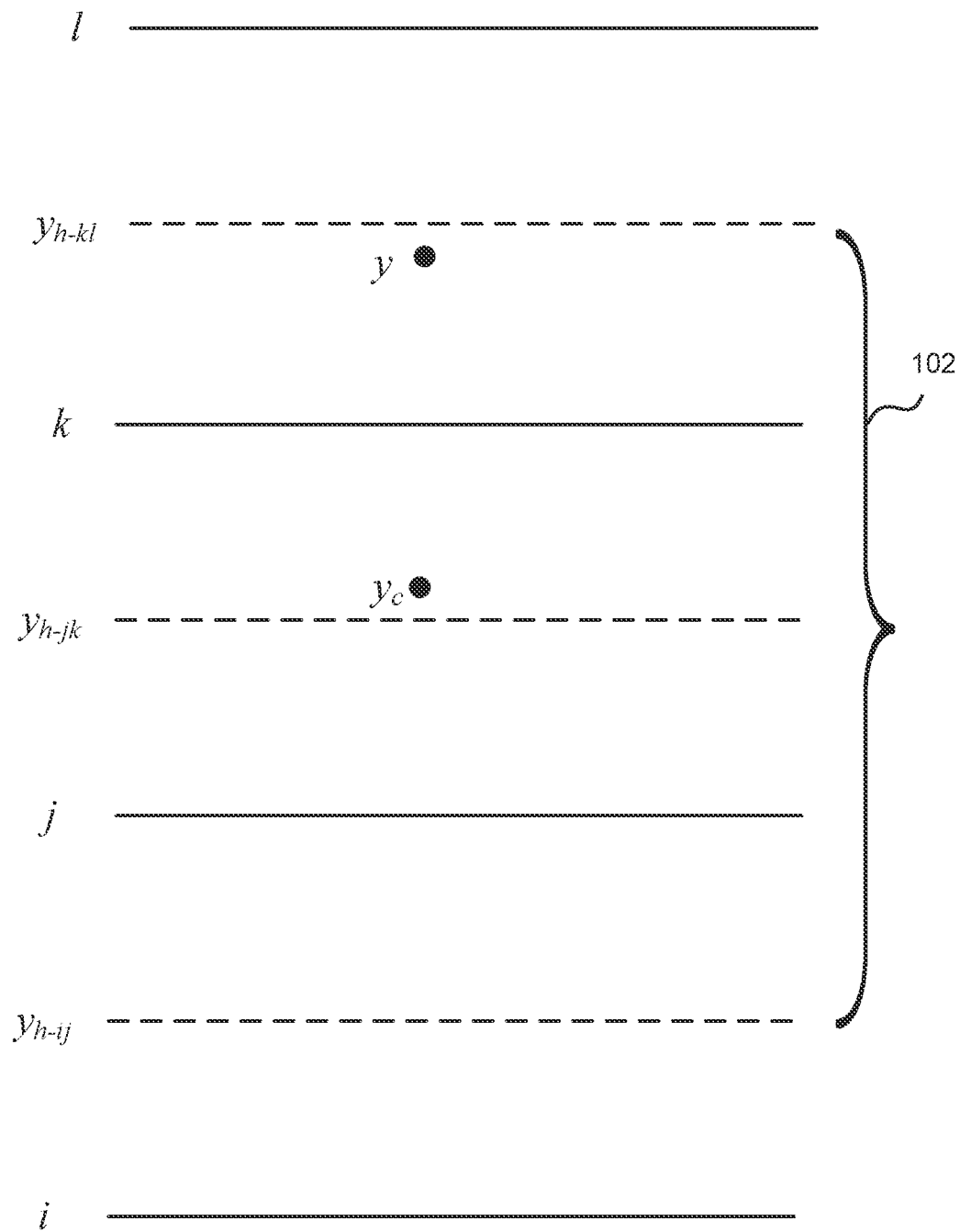
FIG. 1 is a schematic diagram illustrating the accuracy of the calculated result in an intermediate precision that may be achieved by appropriately selecting the number of guard bits.
Figure 2:
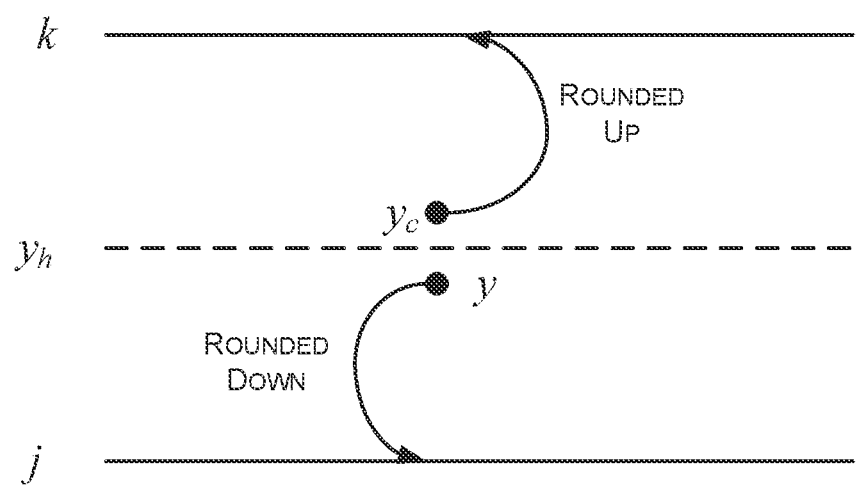
FIG. 2 is a schematic diagram illustrating the rounding error that may occur when the calculated result in an intermediate precision is close to the half way number between two representable numbers in a lower output precision.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, some floating point arithmetic operation hardware implementations are configured to compute the result of the floating point arithmetic operation in an intermediate precision that is higher than the output precision. As is known to a person of skill in the art the precision of a floating point number is based on the number of bits used for the mantissa. Where the output has a mantissa width of mw the output precision (or significand) is mw+1 bits (as described above, the floating point format has an implied bit of precision). The intermediate precision has xm extra mantissa bits (also referred to as guard bits) so that the intermediate precision is mw+1+xm bits. For example, where the output is IEEE double precision the mantissa width mw is 52 which provides 53 bit precision. Where the number of extra bits xm is three then the intermediate precision is 56 bits.

As described above, by choosing the number of guard bits or extra bits appropriately, it can be possible to obtain a calculated result $y_c$ in the intermediate precision which is of sufficient accuracy to ensure that, if the calculated result $y_c$ is not equal to a representable number in the lower output precision, that the infinitely precise result y can be correctly rounded to one of the two consecutive representable numbers of the lower output precision above and below the calculated result $y_c$.

The number lying half way between those two consecutive representable numbers in the lower output precision will be referred to herein as the half way number $y_h$. Accordingly, the half way number $y_h$ is dictated or determined by the calculated result $y_c$ in the intermediate precision.

Where a "round to nearest" rounding technique is used, when the calculated result $y_c$ in the intermediate precision is greater than the half way number $y_h$ then the result will be rounded up to the higher of the two representable numbers in the lower output precision; and conversely when the calculated result $y_c$ in the intermediate precision is less than the half way number $y_h$ then the result will be rounded down to the lower of the two representable numbers in the lower output precision. If the calculated result is equal to the half way number then there is said to be a "tie" and a tie-break is used. Different rounding techniques or methods use different tie-breaks. For example, when there is a tie in the RTE (round to nearest, tie to even) rounding method the result is rounded up if the rounding will produce an even result (i.e. the last bit of the result is zero), otherwise ties are rounded down. However, other rounding modes may use other tie-breaks.

When the calculated result $y_c$ in the intermediate precision is close to the half way number $y_h$ the result $y_c$ in the intermediate precision may fall on the wrong side of the half way number $y_h$. In other words the infinitely precise result y may fall on one side of the half way number $y_h$ and the calculated result $y_c$ in the intermediate precision may fall on the other side of the half way number $y_h$. As described above, this means that in these cases the result will be incorrectly rounded. Accordingly, to be able to correctly round the result of a floating point arithmetic operation $y_c$ in an intermediate precision to a lower output precision using "round to nearest" rounding it is desirable to know whether the infinitely precise result y is greater than or less than the half way number $y_h$.

For many floating point arithmetic operations, whether or not the infinitely precise result y is above or below the half way number $y_h$ can be accurately determined by reversing the arithmetic operation in a single unrounded-step and comparing this to the input(s). For example if the floating point arithmetic operation is a division between two floating point numbers a and b then it is desirable to know if the division is greater than the half way number $y_h$ as shown in inequality (2):

$$\frac{a}{b} > y_h \qquad (2)$$

Inequality (2) can be re-written as a multiplication of the half-way number $y_h$ and the input floating point number b less the input floating point number a as shown in inequality (3). This rearrangement of inequality (2) is based on the assumption that inputs a and b are positive. This assumption can be made because the absolute value can be used for the division and then the sign can be corrected at the end of the computation.

$$y_h \times b - a < 0 \qquad (3)$$

Since inequality (3) includes a single multiplication followed by a single subtraction, inequality (3) can be accurately evaluated (i.e. error free) in one step using a single fused multiply add (FMA) component. Specifically an FMA can accurately determine whether the left-hand side of inequality (3) (i.e. $y_h \times b - a$) is greater than or less than zero. In some cases the FMA can also be configured to specifically identify and indicate when the left hand-side of inequality (3) is exactly equal to zero.

As is known to those of skill in the art a FMA performs a multiplication operation followed by an add operation in one step, with a single rounding. In particular, an unfused multiply-add (i.e. separate multiplication and addition components) would compute the product of two floating point numbers a and b round it to N significant bits, then add the rounded result to c, and round back to N significant bits. In contrast an FMA completes the entire a×b+c to its full precision before rounding the result to N significant bits.

Similarly if the floating point arithmetic operation is the square root of a floating point number a then to be able to correctly round the result, it is desirable to know if the square root of a is greater than the half way number $y_h$ as shown in inequality (4):

$$\sqrt{a} > y_h \qquad (4)$$

Inequality (4) can be re-written as the square of the half way number $y_h$ less the input a as shown in inequality (5) if is assumed that the half way number is positive:

$$y_h^2 - a < 0 \qquad (5)$$

Similar to inequality (3), since inequality (5) includes a single multiplication followed by a single subtraction, inequality (5) can be accurately evaluated (i.e. error free) in one step using a single FMA. Specifically an FMA can accurately determine whether the left-hand side of inequality (5) (i.e. $y_h^2 - a$) is above or below zero. In some cases the FMA can also be configured to specifically identify and indicate when the left hand-side of inequality (5) is exactly equal to zero.

However, for some floating point arithmetic operations (e.g. a reciprocal square root) it is not possible to compute the reverse of the arithmetic operation in a single unrounded-step. For example, if the floating point arithmetic operation is a reciprocal square root of a floating point number a then to be able to correctly round the calculated result $y_c$ in the intermediate precision, it is desirable to know if the reciprocal square root of a is greater than the half way number $y_h$ as shown in inequality (6):

$$\frac{1}{\sqrt{a}} > y_h \qquad (6)$$

Inequality (6) can be re-written into any of inequalities (7), (8) and (9). However, since none of these inequalities comprise a single multiplication combined with a single addition/subtraction they cannot be accurately calculated in a single step using a FMA.

$$\frac{1}{y_h^2} - a > 0 \qquad (7)$$

$$(y_h \times a)^2 - a < 0 \qquad (8)$$

$$y_h^2 \times a - 1 < 0 \qquad (9)$$

Accordingly described herein are methods and hardware implementations for efficiently and accurately determining whether the infinitely precise output y of the reciprocal square root of a floating point number is greater than the half way number $y_h$ indicated by the calculated result $y_c$ in an intermediate precision. As described above, this allows the calculated result $y_c$ of the reciprocal square root in an intermediate precision to be accurately rounded to a lower output precision.

The determination of whether the infinitely precise result y of a reciprocal square root operation performed on a floating point number a is greater than the half way number $y_h$ can be represented by inequality (9) shown above. A definitive (or accurate) answer cannot be achieved by trivially evaluating this inequality in the available precisions due to rounding errors. The inventors have identified, however, that inequality (9) can be accurately evaluated, under certain circumstances, using existing hardware by breaking down the calculation into a series of smaller calculations.

Figure 3:
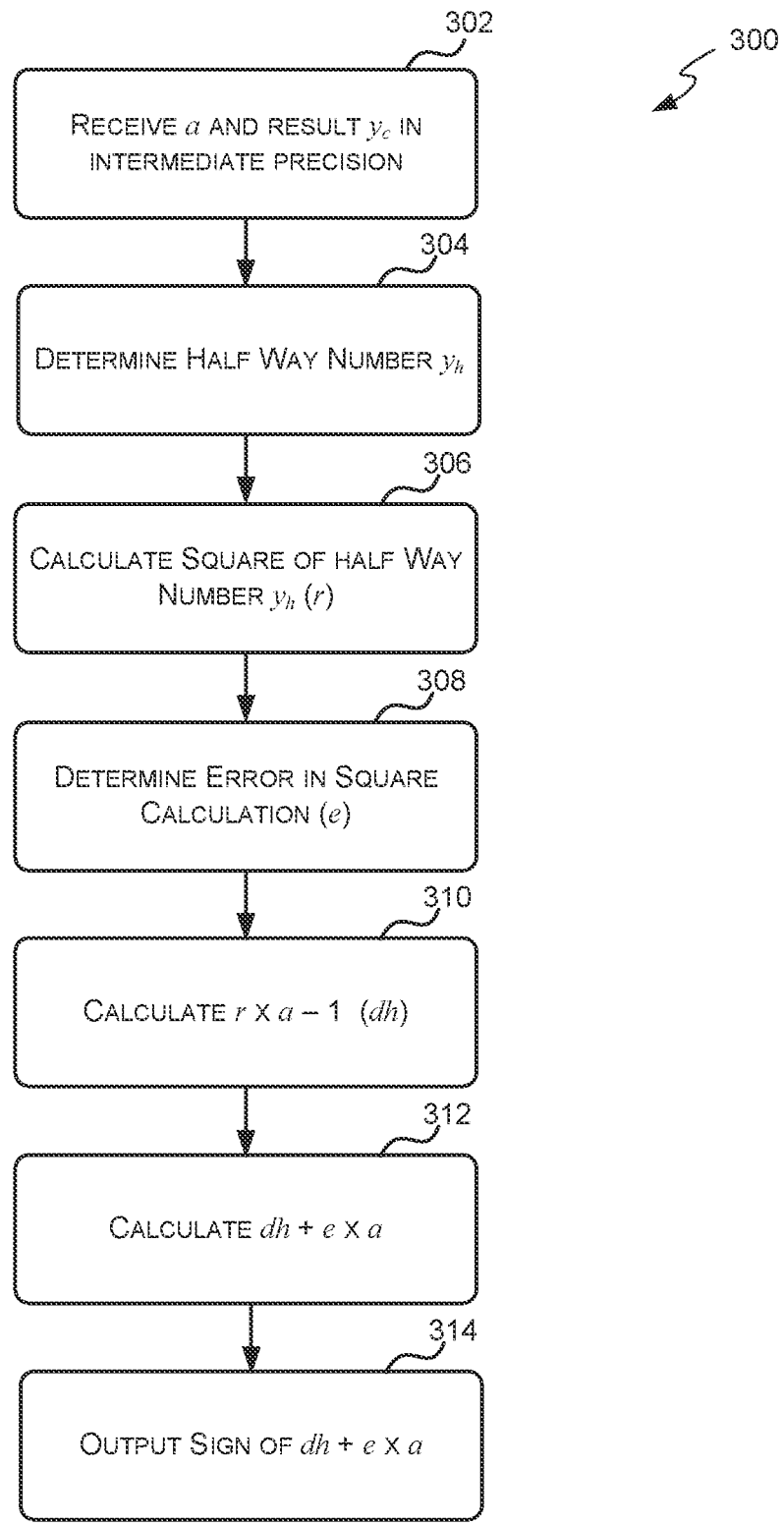
FIG. 3 is a flow diagram of an example method for determining if the infinitely precise result of a reciprocal square root operation is greater than or less than the half way number.

Reference is now made to FIG. 3 which illustrates a method 300 for determining whether the infinitely precise output y of a reciprocal square root operation performed on a floating point number a is greater than or less than the half way number $y_h$ by accurately evaluating inequality (9) via a series of equations. The method 300 begins at block 302 where the input floating point number a and the calculated result $y_c$ of the reciprocal square root operation in the intermediate precision are received from reciprocal square root logic (not shown). Once the input a and the result $y_c$ in the intermediate precision have been received the method 300 proceeds to block 304.

At block 304, the half way number $y_h$ is determined from the result $y_c$ in the intermediate precision. As described above, if the calculated result $y_c$ is not equal to a representable number in the output precision (i.e. the guard bits are zero), then the calculated result $y_c$ in the intermediate precision will lie between two consecutive representable numbers. The half way number $y_h$ is the number in the intermediate precision that lies half way between these two consecutive representable numbers.

Figure 4:
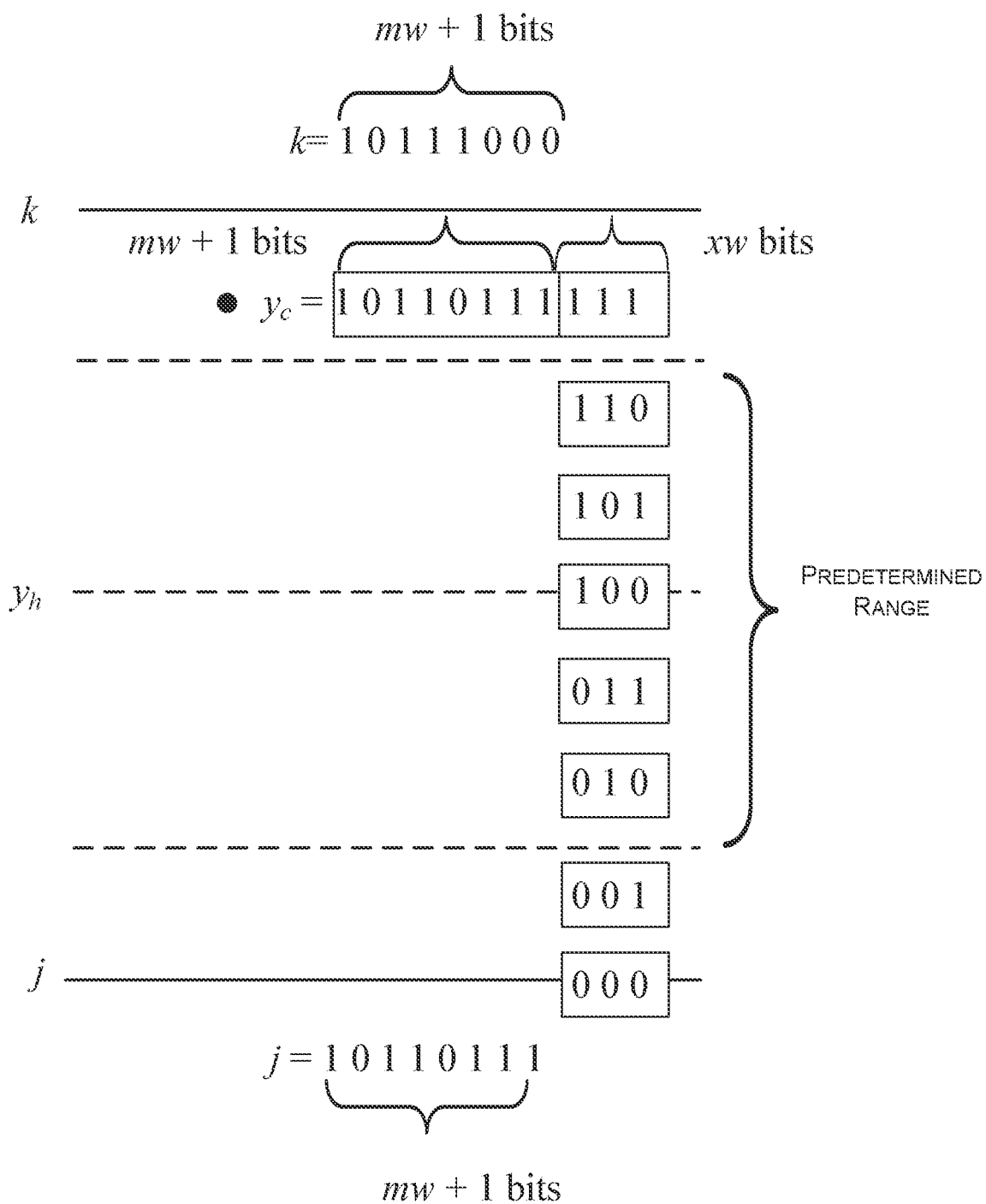
FIG. 4 is a schematic diagram illustrating an example method for determining whether the calculated result is within a predetermined range of the half way number.

The half way number $y_h$ may be generated by setting the half way number $y_h$ to the calculated result $y_c$ and then setting the first guard bit to one and setting the remainder of the guard bits to zero. As described above, the intermediate precision has xw extras bits or guard bits compared to the output precision. For example, as shown in FIG. 4, if xw is equal to 3 and the calculated result $y_c$ is "1 0 1 1 0 1 1 1 1 1". The half way number is generated by setting the half way number $y_h$ to the calculated result $y_c$ ("1 0 1 1 0 1 1 1 1 1 1) and then setting the first guard bit to "1" and setting the remainder of the guard bits to "0" so that the final half way number $y_h$ is "1 0 1 1 0 1 1 1 1 0 0". In other words the first mw+1 bits of the half way number are set to the first mw+1 bits of the calculated result $y_c$, the first guard bit is set to "1", and the remaining guard bits are set to "0". Once the half way number $y_h$ has been determined the method 300 proceeds to block 306.

At block 306, the square of the half way number $y_h$, referred to as r, is calculated in the lower output precision. This is represented by equation (10):

$$r = y_h^2 \qquad (10)$$

Once the square of the half way number $y_h$ has been calculated then method 300 proceeds to block 308.

At block 308, since the calculation of the square of the half way number $y_h$ in block 306 is subject to a rounding error the error e of the calculated r (in the output precision) compared to the infinitely precise $y_h^2$ is determined using equation (11):

$$e = y_h^2 - r \qquad (11)$$

Since equation (11) comprises a single multiplication and a single addition/subtraction it can be accurately evaluated using an FMA. Specifically, since the half way number $y_h$ is half way between two representable numbers in the output precision (mw+1 bits of precision) the half way number $y_h$ requires mw+2 bits of precision to be accurately represented. The square of the half way number, will thus require 2*(mw+2) bits to be accurately represented based on the rules of multiplication. If r is calculated in the output precision (mw+1) then the rounding error appears after mw+1 bits therefore there are at most mw+3 bits of error, e. Accordingly the error e can be accurately represented in the intermediate precision if there are at least two extra bits or guard bits for the intermediate precision (i.e. xm≥2).

Once the error in the square has been determined the method 300 proceeds to block 310.

At block 310, r×a−1, referred to as dh or the first delta value, is calculated. This is shown in equation (12):

$$dh = r \times a - 1 \qquad (12)$$

The relevance of this term becomes evident when equation (9) is rearranged. In particular, equation (11) can be re-arranged in terms of the square of the half way number $y_h$ as shown in equation (13):

$$y_h^2 = r + e \qquad (13)$$

Replacing the square of the half way number $y_h$ in inequality (9) using equation (13) (e.g. replacing $y_h^2$ with r+e) results in inequality (14) which can be rearranged as inequality (15) since (r+e)×a−1=(r×a−1)+e×a:

$$(r+e) \times a - 1 < 0 \qquad (14)$$

$$(r \times a - 1) + e \times a < 0 \qquad (15)$$

From inequality (15) it can be seen that (r×a−1) is a significant term in identifying whether the infinitely precise result y is greater than or less than the half way number $y_h$. The inventors have identified, that when r×a is sufficiently close to 1, dh can be accurately calculated (i.e. without a rounding error, or lossless) within the precision available using an FMA. This will be described in more detail below.

Once dh has been calculated according to equation (12), the method 300 proceeds to block 312.

At block 312, h+e×a, referred to as d or the second delta value, is evaluated in the intermediate precision to determine whether the infinitely precise result y is greater than or less than the half way number $y_h$. This is shown in equation (16):

$$d = dh + e \times a \qquad (16)$$

It can be seen that equation (16) can be generated from the left-hand side of inequality (15) by replacing (r×a−1) with dh.

Due to the single-step rounding of an FMA the sign of d will be accurate for any input a. In particular, an FMA can accurately determine whether d is less than (negative) or greater than (positive) zero. This determination can then be used to decide whether to round the calculated result up or down. In some cases the FMA can also be configured to specifically identify and indicate when d is exactly equal to zero.

For example, if a "round to nearest" rounding mode or technique is used, if d is negative then the half way number $y_h$ is less than the infinitely precise result y thus the result $y_c$ in the intermediate precision should be rounded up; and if d is positive then the half way number $y_h$ is greater than the infinitely precise result y and thus the result $y_c$ in the intermediate precision should be rounded down. If d is equal to zero then it may be rounded up or down according to a tie-break rule. For example, as described above, when RTE rounding is used ties are rounded up if that will produce an even result (i.e. the last bit of the result is zero) otherwise ties are rounded down.

Once dh has been calculated the method 300 proceeds to bock 314 where an indication of whether the infinitely precise result is greater than, less than or equal to the half way number is output based on the value of d. In some cases it may not be relevant to know whether the output is equal to the half way number. For example, it may not be possible for the infinitely precise result to be equal to the half way number. In these cases the sign of d may be output to indicate whether the infinitely precise result y is greater than or less than the half way number $y_h$.

The method 300 described with reference to FIG. 3 allows a reciprocal square root result to be accurately rounded in manner that uses minimal and existing hardware (i.e. hardware that likely already forms part of a reciprocal square root circuit or logic unit, such as an FMA). The method 300 may also produce a faster result than other methods that assume the first delta dh has an error component that needs to be taken into account. For example, such methods may require additional (potentially hundreds of) passes through an FMA to correctly determine whether to round up or round down. The method 300 also allows reciprocal square root results to be accurately rounded with very few extra or guard bits.

In some examples, before blocks 304 to 314 are executed a determination may be made as to whether the calculated result $y_c$ in the intermediate precision is within a predetermined range of the half way number $y_h$ (i.e. it is "close" to the half way number). If is determined that the calculated result $y_c$ in the intermediate precision is within the predetermined range of the half way number $y_h$ then the method 300 may proceed to blocks 304 to 314 to determine whether the infinitely precise result y is greater than, less than or equal to the half way number $y_h$. Then the calculated result $y_c$ in the intermediate precision may be rounded up or down in the output precision based on the determination of whether the infinitely precise result y is greater than, less than or equal to the half way number $y_h$. If, however, it determined that the calculated result $y_c$ in the intermediate precision is not within the predetermined range of the half way number $y_h$ (i.e. it is "far" from the half way number $y_h$) then the method 300 may end and the calculated result $y_c$ may be directly rounded to the nearest representable number in the output precision.

In some cases the determination of whether the calculated result $y_c$ in the intermediate precision is within a predetermined range of the half way number $y_h$ may be based on the additional or guard bits of the calculated result $y_c$. As described above, the output result has a precision of mw+1 bits and the calculated result $y_c$ has a higher precision with xm extra bits which may be referred to as the guard bits. For example, if, as shown in FIG. 4, mw is equal to seven and xm is equal to three, the representable output numbers (e.g. j and k) will have eight bits of precision and the calculated result $y_c$ will have eleven bits of precision.

For each pair of consecutive representable numbers in the output precision (e.g. mw+1 bits of precision) there will be $2^{xm}-1$ possible numbers in the intermediate precision that lie between them. For example, in FIG. 4 xm=3 thus there are $2^3-1=7$ numbers in the intermediate precision that lie between two consecutive representable number j and k. Each of the numbers in the intermediate precision that lie between the two representable numbers in the lower output precision has the same first mw+1 bits (which is equal to the lower of the two representable numbers in the lower output precision); however the extra/guard bits differ. For example, each of the possible intermediate values between j=10110111 and k=10111000 comprises the sequence "10110111" followed by an extra three bits.

In some cases, where xm is equal to three, a calculated result will be determined to be within a predetermined range of the half way number $y_h$ if the extra bits/guard bits comprise the patterns 010 to 110 inclusive as shown in FIG. 4.

It will be evident to a person of skill in the art that this is an example only and that other methods and techniques may be used to determine whether a calculated result in the intermediate precision is within a predetermined range of the half way number $y_h$. For example, a different range of guard bit patterns may be used to determine whether a calculated result $y_c$ is within a predetermined range to the half way number $y_h$. In general the predetermined range (e.g. range of intermediate values) is based on the accuracy of the calculated result $y_c$ in the intermediate precision.

Accurate Evaluation of r×a−1

As described above, the inventors have identified that r×a−1 can be accurately represented in the intermediate precision when r×a is close to one. This allows equation (12) to be singled out from inequality (15) and separately evaluated without causing an inaccurate result due to rounding errors. It would not be obvious to a person of skill in the art that this is the case.

In particular, the half way number $y_h$ is roughly equal to the reciprocal square root of input floating point number a as shown in equation (17):

$$y_h \cong \frac{1}{\sqrt{a}} \quad (17)$$

Equation (17) can be re-written as equation (18) to reflect the precise relative error, ε, in $y_h$ compared to the infinitely precise result y of the reciprocal square root:

$$y_h = \frac{1}{\sqrt{a}}(1+\varepsilon) \quad (18)$$

Similarly r is roughly equal to $y_h^2$ as shown in equation (19):

$$r \cong y_h^2 \quad (19)$$

Equation (19) can be re-written as equation (20) to reflect the rounding error, K, compared to the infinitely precise result $y_h^2$:

$$r = y_h^2(1+\kappa) \quad (20)$$

Equation (12) can then be written in terms of equation (20) (i.e. $y_h$ is replaced with $y_h^2(1+K)$) to produce equation (21):

$$dh = y_h^2(1+\kappa) \times a - 1 \quad (21)$$

Equation (21) can then be written in terms of equation (18) (i.e. $y_h$ is replaced with $$\frac{1}{\sqrt{a}}(1+\varepsilon))$$

to produce equation (22), which can be simplified to equation (23)) as the a's cancel out, and then expanded to equations (24), (25), and (26):

$$dh = \left(\frac{1}{\sqrt{a}}(1+\varepsilon)\right)^2 (1+\kappa) \times a - 1 \quad (22)$$

$$dh = (1+\varepsilon)^2(1+\kappa) - 1 \quad (23)$$

$$dh = (1 + 2\varepsilon + \varepsilon^2)(1+\kappa) - 1 \quad (24)$$

$$dh = 1 + 2\varepsilon + \varepsilon^2 + \kappa + 2\kappa\varepsilon + \kappa\varepsilon^2 - 1 \quad (25)$$

$$dh = 2\varepsilon + \varepsilon^2 + \kappa + 2\kappa\varepsilon + \kappa\varepsilon^2 \quad (26)$$

From equation (26) it is evident that dh can be accurately calculated if $2\varepsilon+\varepsilon^2+\kappa+2\kappa\varepsilon+\kappa\varepsilon^2$ can be accurately represented in the available precision (i.e. without rounding).

Figure 5:
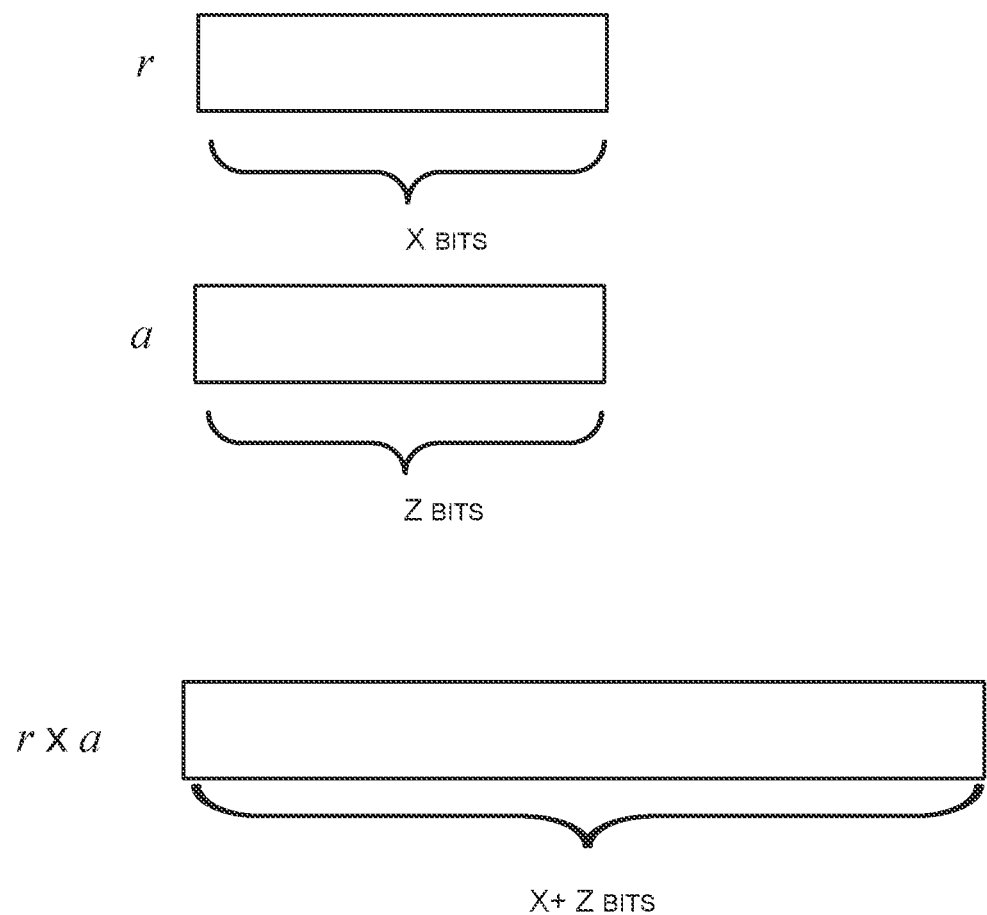
FIG. 5 is a schematic diagram showing multiplication of two floating point numbers.

The multiplication of two floating point numbers, r and a, with X and Z bits of precision respectively, as shown in FIG. 5, will require X+Z bits of precision to accurately represent the result. For example, if r and a are both represented using the IEEE double precision, which provides 53 bits of precision (therefore X=Z=mw+1=53), the result of the multiplication of r and a will require 106 bits of precision to be accurately represented.

Figure 6:
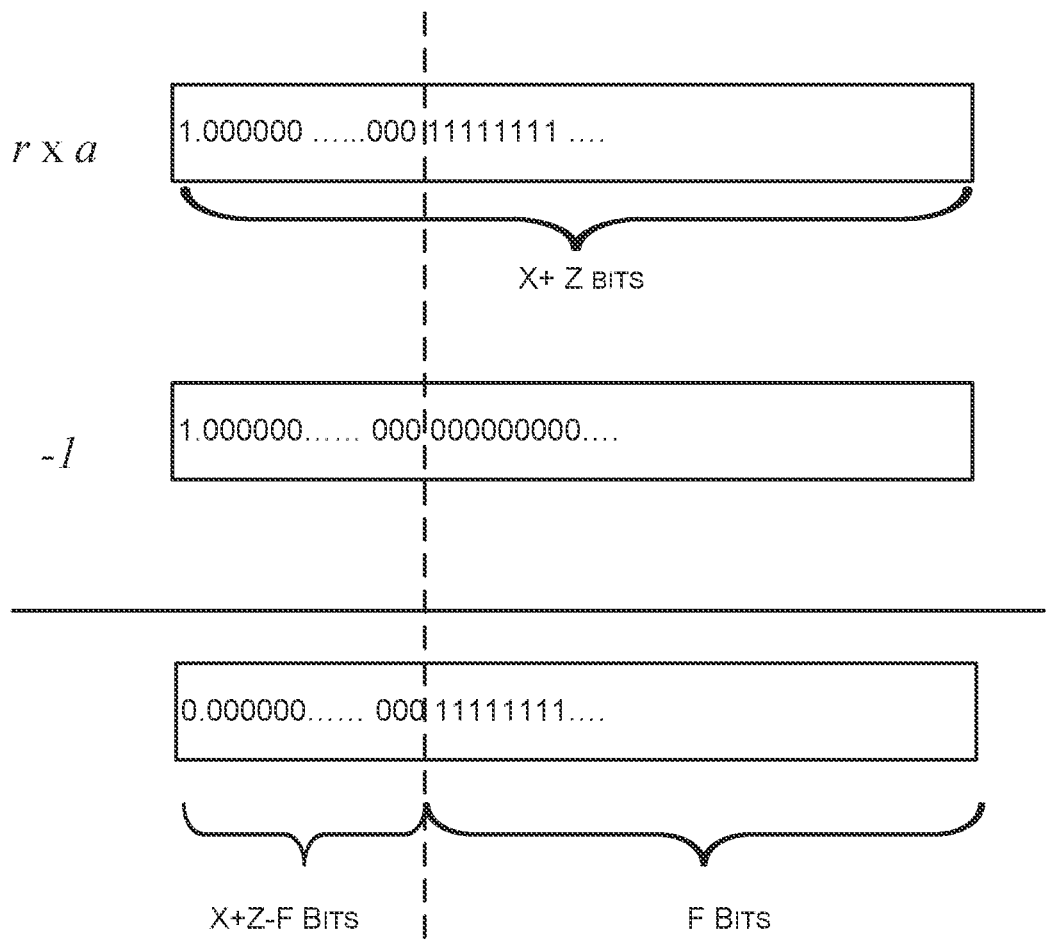
FIG. 6 is a schematic diagram showing the representation of a multiply-add operation.

However, if the result of the multiplication r×a is close to one then subtracting one from the multiplication r×a (which can be done in one step with an FMA) will result in an X+Z bit number, but with a number of leading zeroes. If F is the number of bits of precision available for the result of the FMA then the result can be accurately represented in the available precision if the first X+Z-F bits are zero as shown in FIG. 6. This means that r×a-1 can be accurately represented if it is less than $2^{-(X+Z-F)}$.

Where r and a are represented in the output precision then the bits of precision for a and r is mw+1 (X=Z=mw+1) and F is the intermediate precision which has mw+xw+1 bits of precision (F=mw+1+xw). In this case, r×a-1 can be accurately represented (i.e. without rounding error) if its absolute value (i.e. $|\alpha|$) is less than $2^{-(mw+1+mw+1-(mw+1+xw))} = 2^{-(mw+1-xw)}$. For example, if r and a are both represented using the IEEE double precision, which, as per Table 1, provides 53 bits of precision (i.e. mw+1=53), and the intermediate precision provides 3 extra bits for the mantissa (i.e. xw=3), the result of r×a-1 can be accurately represented if its absolute value is less than $2^{-(53-3)}=2^{-50}$.

Accordingly, from equation (26) it is evident that when r and a each have mw+1 bits of precision and, r×a-1 can accurately be represented with mw+1+xm bits of precision if $|2\varepsilon+\varepsilon^2+\kappa+2\kappa\varepsilon+\kappa\varepsilon^2|$ is less than $2^{-(mw-xw)}$ as shown in inequality (27):

$$|2\varepsilon+\varepsilon^2+\kappa+2\kappa\varepsilon+\kappa\varepsilon^2|<2^{-(mw+1-xw)} \quad (27)$$

Inequality (27) will always be true if inequality (28) is true:

$$2|\varepsilon|+|\varepsilon|^2+|\kappa|+2|\kappa||\varepsilon|+|\kappa||\varepsilon|^2<2^{-(mw+1-xw)} \quad (28)$$

Since r is represented in the output precision (i.e. there are mw+1 bits of precision) and κ is the rounding error in calculating r, the absolute value of κ will be less than or equal to $2^{-(mw+1)}$ as show in inequality (29):

$$|\kappa| \leq 2^{-(mw+1)} \quad (29)$$

If inequality (28) is re-written in terms of inequality (29) (i.e. $|\kappa|$ is replaced with $2^{-(mw+1)}$) the result is inequality (30):

$$2|\varepsilon|+|\varepsilon|^2+2^{-(mw+1)}+2^{-mw}|\varepsilon|+2^{-(mw+1)}|\varepsilon|^2<2^{-(mw+1-xw)} \quad (30)$$

From inequality (30) it is evident that r×a-1 can be accurately represented (i.e. without rounding error) in the intermediate precision (with mw+1+xm bits of precision) if the error ε between the half way number $y_h$ and the infinitely precise result y satisfies inequality (30). This will occur, for example, when $\varepsilon<2^{-mw}$ and xw is at least two. It is possible, using methods such as Newton Raphson, to generate $y_c$ with an accuracy of $2^{-(mw+1)}$. Where this is the case $y_h$ will have a maximum error of within $2^{-mw}$.

First Example System for Implementing Method of FIG. 3

Figure 7:
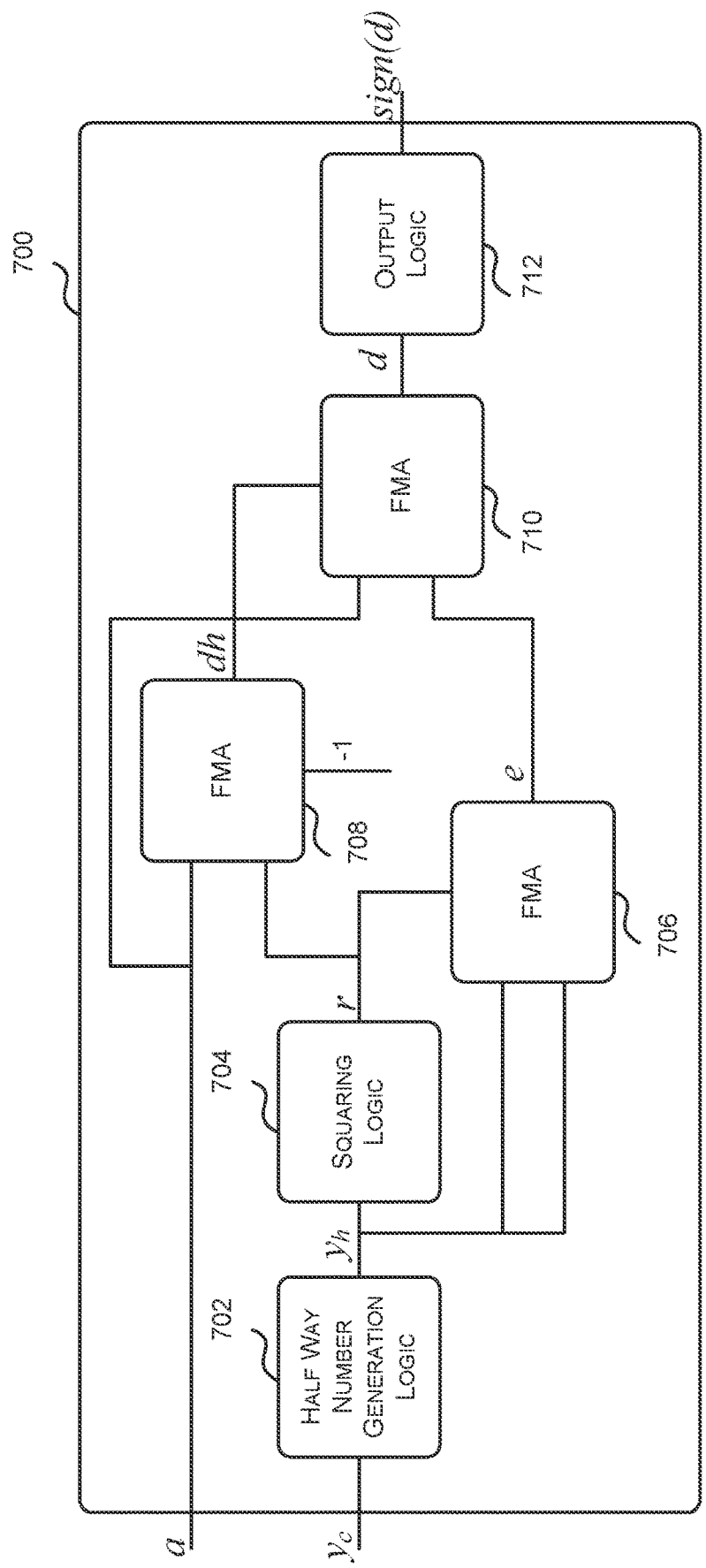
FIG. 7 is a block diagram of a first example system for determining if the infinitely precise result of a reciprocal square root operation is greater than or less than the half way number using the method of FIG. 3.
Figure 9:
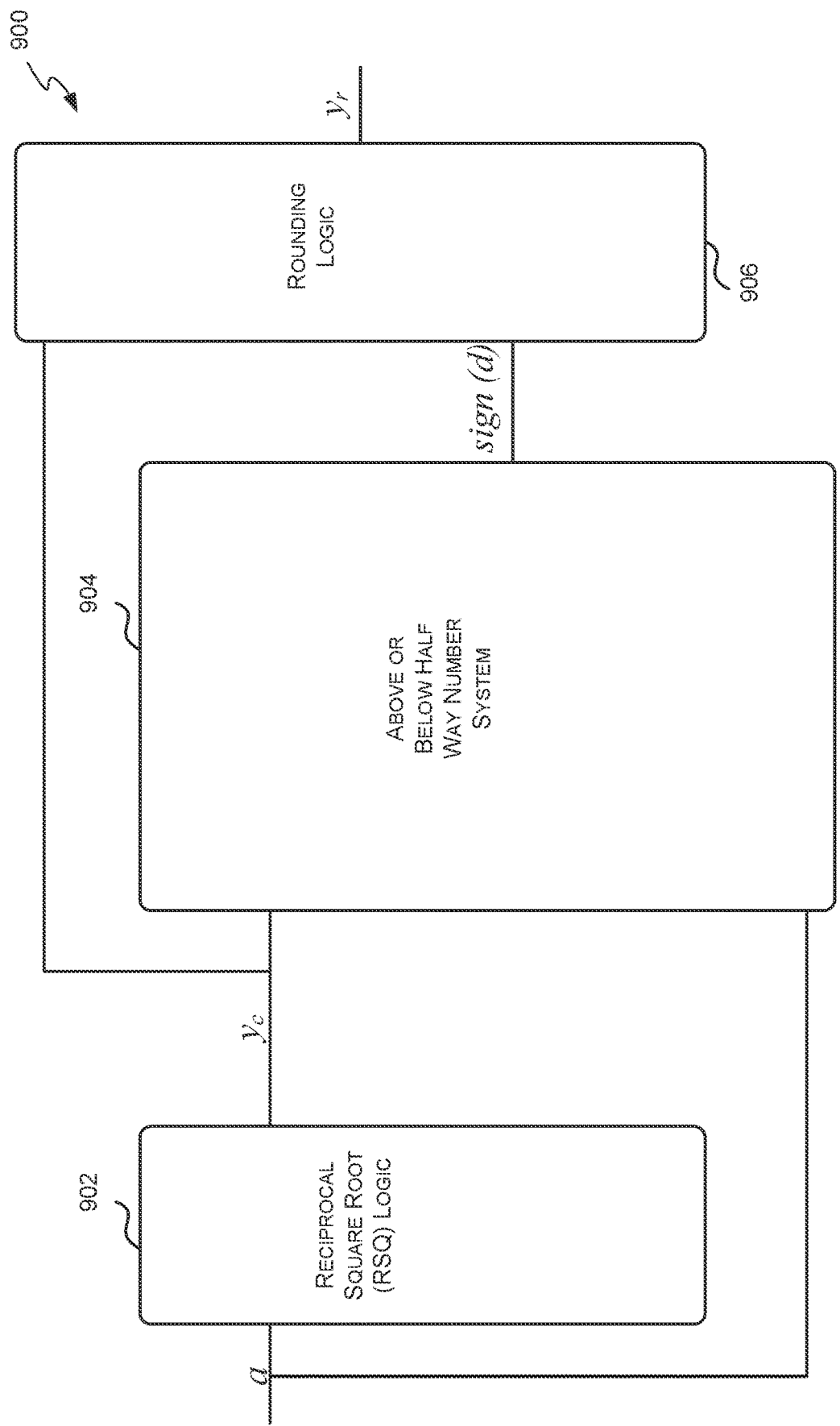
FIG. 9 is a block diagram of an example system for generating an accurately rounded result of a reciprocal square root operation.

Reference is now made to FIG. 7 which illustrates a first example system 700 for determining whether the infinitely precise result y of a reciprocal square root calculation preformed on a floating point number a is greater than or less than a half way number $y_h$ indicated by the calculated result $y_c$ in an intermediate precision in accordance with the method 300 of FIG. 3. The computer system 700 receives as inputs the input floating point number a in the output precision and the calculated result $y_c$ in the intermediate precision and outputs an indication of whether the infinitely precise result y of the reciprocal square root calculation is greater than, less than, or equal to the half way number $y_h$. As described with reference to FIG. 9 the output indication can then be used to determine whether the calculated result $y_c$ in the intermediate precision should be rounded up or rounded down in a lower output precision.

The system 700 comprises half way number generation logic 702, squaring logic 704, three multiply-add logic 706, 708, and 710 and output logic 712.

The half way number generation logic 702 receives the calculated result $y_c$ in the intermediate precision (i.e. it has mw+1+xm bits of precision) and generates and outputs a half way number $y_h$ based on the calculated result. As described above the half way number $y_h$ is the number in the intermediate precision (i.e. with mw+1+xm bits of precision) that lies halfway between the closest representable number in the output precision below the calculated result and the closest representable number in the output precision above the calculated result.

The half way number $y_h$ may be generated from the calculated result $y_c$ by setting the extra bits or guard bits of $y_h$ to "1 0 0 . . . ". For example if the calculated result $y_c$ is equal to "1 0 1 1 0 1 1 1 1 1 1" and has three guard bits (i.e. the last three bits are extra bits) then the half way number $y_h$ is equal to "1 0 1 1 0 1 1 1 1 0 0".

In some cases the system 700 may also comprise a logic unit (not shown) that determines whether the calculated result is representable in the lower output precision (indicating it is a correctly rounded output result) and only forwards the calculated result to the squaring logic 702 if it is determined that the calculated result is not representable in the lower output precision. For example, the logic unit may be configured to determine that the calculated result is representable in the lower output precision if the extra or guard bits are zero.

The squaring logic 704 is coupled to the output of the half way number generation logic 702 to receive the half way number $y_h$. The squaring logic 704 is configured to calculate and output the square of the half way number $y_h$, referred to as r. For example, the squaring logic 704 may be configured to evaluate equation (10) described above. In some cases the calculated square of the half way number r is represented in the output precision (i.e. with mw+1 bits or precision). In some cases the squaring logic 704 may be implemented using a fused-multiply add component that is configured to calculate, for example, $y_h*y_h+0$ or $y_h*y_h-0$.

The first multiply-add logic 706 is coupled to the output of the half way number generation logic 702 and the output of the squaring logic 704 to receive the half way number $y_h$ and the calculated square of the half way number r. The first multiply-add logic 706 is configured to calculate and output the error in the calculated square r, referred to as e. In some cases the first multiply-add logic 706 may be configured to calculate the error in the calculated square r by calculating, in one step, the square of the half way number $y_h$ less the calculated square of the half way number r. For example, the first multiply-add logic 706 may be configured to evaluate equation (11) described above. In some cases the first multiply-add logic 706 may be configured to invert the output of the squaring logic (i.e. invert r) prior to performing the calculation. In other cases there may be inverter or negate logic between the output of the squaring logic 704 and the input to the first multiply-add logic 706. As shown in FIG. 7 the first multiply-add logic 706 may be implemented as a fused multiply-add component.

The second multiply-add logic 708 is coupled to the floating point input a and the output of the squaring logic 704 to receive the floating point input a and the calculated square of the half way number r. The second multiply-add logic 708 is configured to calculate and output r×a−1, referred to as dh or the first delta value. For example, the second multiply-add logic 708 may be configured to evaluate equation (12) described above. In some cases dh or the first delta value is represented in the intermediate precision (i.e. using mw+1+xm mantissa bits). As shown in FIG. 7 the second multiply-add logic 708 may be implemented as a fused multiply-add component.

The third multiply-add logic 710 is coupled to the floating point input a, the output of the first multiply-add logic 706, and the output of the second multiply-add logic 708, to receive the floating point input a, the calculated error e in the calculated square of the half way number, and the calculated dh or first delta value. The third multiply-add logic 710 is configured to calculate and output dh+e×a, referred to as d or the second delta value, in a single rounding step. For example, the third multiply-add logic 710 may be configured to evaluate equation (16) described above. As shown in FIG. 7 the third multiply-add logic 710 may be implemented as a fused multiply-add component.

As described above, the sign of d correctly or accurately indicates whether the infinitely precise result y of the reciprocal square root operation is greater than or less than the half way number $y_h$. Where "round to nearest rounding" is used, if d is negative then the half way number $y_h$ is less than the infinitely precise result y and the result $y_c$ in the intermediate precision should be rounded up; and if d is positive then the half way number $y_h$ is greater than the infinitely precise result y and the result $y_c$ in the intermediate precision should be rounded down.

The output logic 712 is coupled to the output of the third multiply-add logic 710 to receive d. The output logic 712 is configured to output an indication of whether the infinitely precise result is above, below or equal to the half way number based on the received d. For example, the output logic 712 may be configured to output a "1" when d or the second delta value is positive and output a "0" when d or the second delta value is negative. In some cases the output logic 712 may simply output the sign bit, s, of the input d.

The system 700 may be implemented in hardware (e.g. as fixed function circuitry in a computer processor); software (e.g. software to be executed on a processor); or a combination of hardware and software. Implementing the system 700 completely in hardware may allow for faster computation.

Second Example System for Implementing Method of FIG. 3

Figure 8:
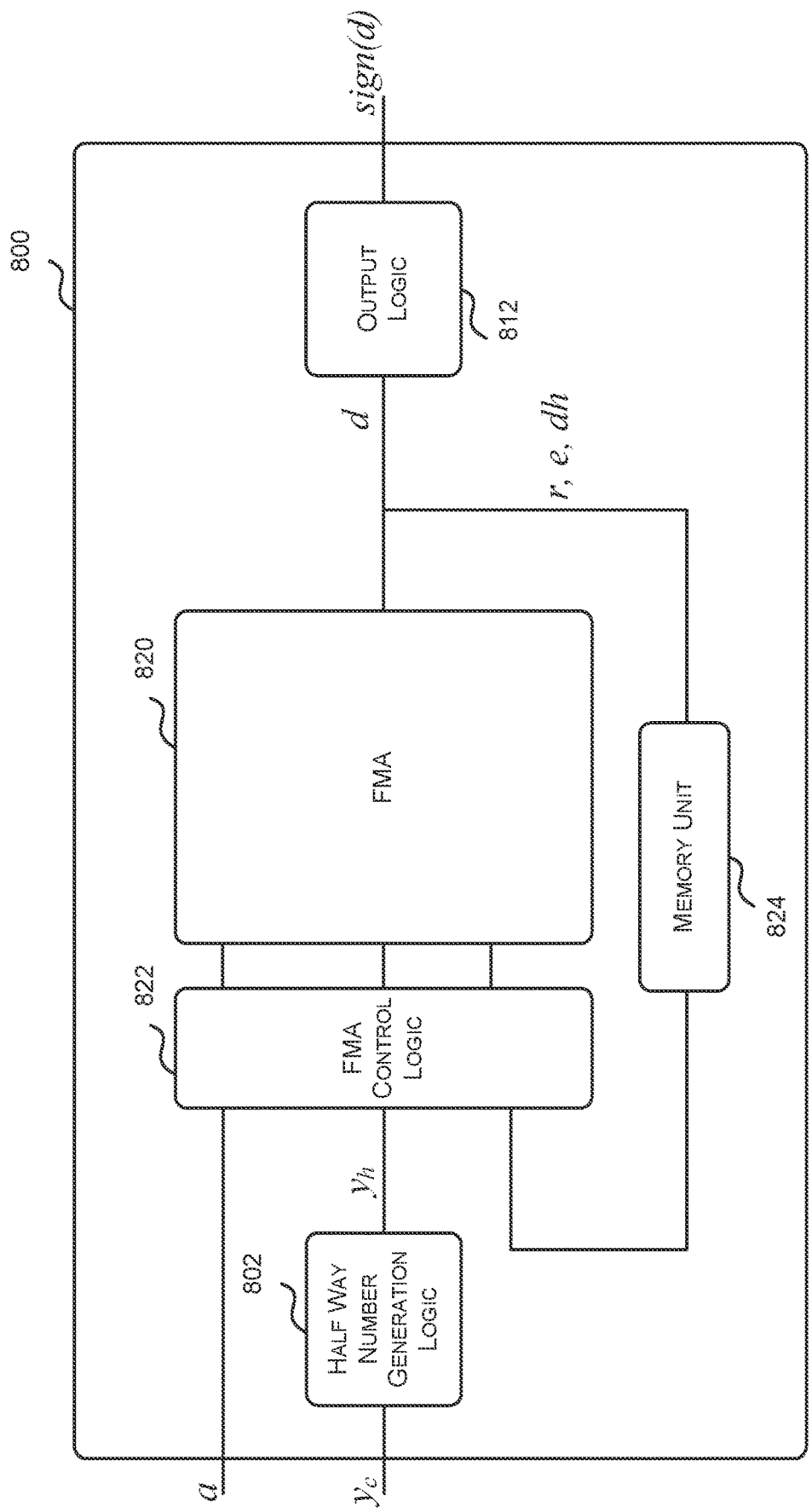
FIG. 8 is a block diagram of a second example system for determining if the infinitely precise result of a reciprocal square root operation is greater than or less than the half way number using the method of FIG. 3.

Reference is made to FIG. 8 which illustrates a second example system 800 for determining whether the infinitely precise result y of a reciprocal square root calculation preformed on a floating point number a is greater than, less than, or equal to a half way number $y_h$ indicated by the calculated result $y_c$ in an intermediate precision in accordance with the method 300 of FIG. 3. The computer system 800, like the computer system 700 of FIG. 7, receives as inputs the input floating point number a in the output precision and the calculated result $y_c$ in the intermediate precision and outputs an indication of whether the infinitely precise result y of the reciprocal square root calculation is greater than, less than, or equal to the half way number $y_h$. As described below with reference to FIG. 9 the output indication can then be used to determine whether the calculated result $y_c$ in the intermediate precision should be rounded up or rounded down in a lower output precision.

Like the system 700 of FIG. 7, the system 800 comprises half way number generation logic 802, and output logic 812 which operate in the same manner as the half way number generation logic 702 and the output logic 712 of FIG. 7 to generate the half way number and output an indication of whether the infinitely precise result is above, below or equal to the half way number respectively. However, instead of having multiple components dedicated to calculating a specific equation, the system 800 of FIG. 8 comprises a single multiply-add logic 820 that is configured to perform the functions of the multiply-add logic 706, 708, 710 and squaring logic 704 of FIG. 7 over a number of system cycles (e.g. clock cycles).

For example, in a first clock cycle the multiply-add logic 820 may calculate and output the square of the half way number $y_h$, referred to as r. For example, the multiply-add logic 820 may be configured to evaluate equation (10) described above in a first clock cycle.

In a second clock cycle the multiply-add logic 820 may calculate and output the error in the calculated square r, referred to as e. In some cases the multiply-add logic 820 may be configured to calculate the error in the calculated square r by calculating, in one step, the square of the half way number $y_h$ less the calculated square of the half way number r. For example, the multiply-add logic 820 may be configured to evaluate equation (11) described above in a second clock cycle.

In a third clock cycle the multiply-add logic 820 may calculate and output r×a−1, referred to as dh or the first delta value. For example, the multiply-add logic 820 may be configured to evaluate equation (12) described above in a third clock cycle.

In a fourth clock cycle the multiply-add logic 820 may calculate and output dh+e×a, referred to as d or the second delta value, in a single rounding step. For example, the multiply-add logic 810 may be configured to evaluate equation (16) described above in a fourth clock cycle.

It will be evident to a person of skill in the art that this is an example of the ordering of the calculations and in other example the calculations may be performed in another order. For example, in some cases dh may be calculated in the second clock cycle and e in the third clock cycle.

The system 800 may also comprise control logic 822 that is configured to provide the appropriate inputs to the FMA in each cycle (e.g. clock cycle). For example, the control logic 822 may be configured to receive as inputs the input floating point number a, the half way number $y_h$, and the output(s) of the FMA 820; and select, from these inputs, the appropriate inputs to the FMA 820 for each cycle (e.g. clock cycle).

For example, where the FMA 820 receives three inputs—the first two inputs representing the two numbers to be multiplied together and the third input representing the number to be added to the result of the multiplication—in the first clock cycle the control logic 822 may be configured to provide the half way number $y_h$ as the first two inputs to the FMA 820 and zero as the third input to the FMA 820. In the second clock cycle the control logic 822 may be configured to provide the half-way number $y_h$ as the first two inputs of the FMA 820 and the negative square of the half way number r as the third input of the FMA 820. In the third clock cycle the control logic 822 may be configured to provide the square of the half way number r and the input floating point number a as the first two inputs of the FMA 820 and −1 as the third input to the FMA 820. In the fourth clock cycle the control logic 822 may be configured to provide the error in the square e and the input floating point number a as the first two inputs to the FMA 820 and the first delta value dh as the third input to the FMA 820.

The control logic 822 may be implemented in hardware or software. For example, in some cases the control logic 822 may be implemented as one or more multiplexers.

The system 800 may also comprise one or more storage units 824 for storing the output of the FMA 820 in a particular cycle (e.g. clock cycle) for use in a later cycle (e.g. clock cycle). For example, the one or more storage units 824 may be configured to store the outputs r and e for use in a later calculation (e.g. in a later cycle).

The one or more storage units 824 may be connected or otherwise coupled to the output of the FMA 820 to receive the output; and connected or otherwise coupled to an input of the control logic 822 to provide the stored output as an input to the control logic 822. The one or more storage units 824 may be implemented using any storage mechanism suitable for storing a binary number such as, but not limited to, one or more registers, or one or more memory units.

The system 800 may be implemented in hardware (e.g. as fixed function circuitry in a computer processor); software (e.g. software to be executed on a processor); or a combination of hardware and software. Implementing the system 800 completely in hardware may allow for faster computation.

The system 800 may provide a significant improvement over system 700 in terms of hardware and space required to implement the system since only a single multiply-add component (e.g. FMA) is used to perform all of the calculations.

It will be evident to a person of skill in the art that systems 700 and 800 are examples only, and the method 300 described above with reference to FIG. 3 for determining whether the infinitely precise result y of a floating point reciprocal square root operation is above or below a half way number, may be implemented in another manner. For example, in other examples the system may not comprise output logic 712 or 812 and may alternatively be configured to directly output d generated by the third multiply-add logic 710 or the single multiply-add component 820.

Example System for Generating an Accurately Rounded Reciprocal Square Root Result Reference is now made to an example system 900 for generating a result $y_r$ to a reciprocal square root operation performed on a floating point input number a that is correctly or accurately rounded to an output precision (e.g. mw+1 bits of precision). The system 900 comprises reciprocal square root logic 902, an above or below half way number system 904 implementing the method 300 of FIG. 3 (e.g. system 700 or 800), and rounding logic 906.

The reciprocal square root logic 902 is configured to receive a floating point number a in the output precision. The reciprocal square root logic 902 is configured to calculate and output the reciprocal square root of the input floating point number a, in an intermediate precision (e.g. mw+1+xm bits of precision) which is greater than the output precision (e.g. mw+1 bits of precision). The calculated result $y_c$ in the intermediate precision has a relative error of strictly less than $2^{-(mw+1)}$ compared to the infinitely precise result y. The reciprocal square root logic 902 may be configured to use any suitable method for calculating the reciprocal square root of a with the required accuracy. For example, the reciprocal square root logic 902 may be configured to calculate the reciprocal square root of a using a converging approximation technique, such as, but not limited to, a Newton-Raphson technique or a Goldschmidt technique.

The above or below half way number system 904 (e.g. system 700 or 800) is coupled to the input floating point number a and the output of the reciprocal square root logic 902 to receive the input floating point number a in the output precision and the calculated result $y_c$ in the intermediate precision. As described above with respect to FIGS. 7 and 8, the above or below half way number system 904 is configured to generate, from the input floating point number a and the calculated result $y_c$ in the intermediate precision, an accurate indication (e.g. sign(d)) of whether the infinitely precise result y of the reciprocal square root is greater than, less than or equal to the half way number $y_h$ indicated by the calculated result $y_c$ in the intermediate precision.

The rounding logic 906 is coupled to the output of the reciprocal square root logic 902 and the output of the above or below half way number system 904 to receive the calculated result $y_c$ in the intermediate precision and the indication (e.g. sign (d)) indicating whether the infinitely precise result is greater than, less than or equal to the half way number $y_h$. The rounding logic 906 is configured to correctly round the calculated result $y_c$ in the intermediate precision to the output precision based on the indication (e.g. sign (d)) and the specific rounding technique used.

For example, if a "round to nearest" rounding technique or method is used and the output of the above or below half way number system 904 (e.g. sign (d)) indicates that the infinitely precise result y is greater than the half way number $y_h$ then the rounding logic 906 may be configured to round the calculated result up to the first representable number in the output precision that is greater than the calculated result $y_c$; and if the output of the above or below half way number system 904 (e.g. sign (d)) indicates the infinitely precise result is less than the half way number $y_h$ then the rounding logic 906 may be configured to round the calculated result $y_c$ down to the first representable number in the output precision that is less than the calculated result $y_c$.

If the infinitely precise result is equal to the half-way number then a tie-break technique is used. For example, as described above, if the RTE (round to nearest, tie to even) rounding method or technique is used then the calculated result is rounded up if that will produce an even result (i.e. the last bit of the result is 0) otherwise the calculated result is rounded down.

Where the output precision has mw+1 bits of precision then rounding the calculated result $y_c$ down may comprise setting the output result $y_r$ to the first mw bits of the calculated result $y_c$, and rounding the calculated result $y_c$ up may comprise setting the output result to the first mw bits of the calculated result $y_c$ and adding 1. For example, if, as shown in FIG. 4, the calculated result $y_c$ in the intermediate precision is 11 bits long with 3 guard bits and is equal to "1 0 1 1 0 1 1 1 1 1 1" then rounding the calculated result $y_c$ up to k comprises selecting the first 8 bits ("1 0 1 1 0 1 1 1") and adding 1 which results in "1 0 1 1 1 0 0 0"; and rounding the calculated result $y_c$ down to j comprises selecting the first 8 bits ("1 0 1 1 0 1 1 1").

The system 900 may be implemented in hardware (e.g. as fixed function circuitry in a computer processor); software (e.g. software to be executed on a processor); or a combination of hardware and software. Implementing the system 900 completely in hardware may allow for faster computation.

It will be evident to a person of skill in the art that computer system 900 is an example of a system for determining an accurately rounded result of a reciprocal square root operation using the method 300 described above with reference to FIG. 3 to determine whether the infinitely precise result y of a floating point reciprocal square root operation is above or below a half way number, and other systems using the principles and techniques described herein may be implemented in a different manner.

For example, in other examples the system may also comprise decision logic (not shown) which is configured to receive the calculated result $y_c$ and determine whether the calculated result $y_c$ in the intermediate precision is far enough away from the half way number $y_h$ that it can be directly rounded without first determining whether the infinitely precise result is above or below the half way number $y_h$. In some cases, as described above, the decision logic may be configured to determine the calculated result $y_c$ is "close" to the half way number $y_h$ when the guard bits of the calculated result $y_c$ have a specified pattern (e.g. "0 1 0" to "0 1 0 . . . " inclusive). The output of the decision logic may then be provided to the rounding logic 906 to determine whether the calculated result can be rounded directly without the output from the above or below half way number system 904.

Although the methods and systems described above have been described in reference to rounding the calculated output in the intermediate precision to a lower output precision using a "round to nearest" rounding technique or mode, the methods and principles described above may be similarly applied to round the calculated output in the intermediate precision to a lower output precision using other rounding techniques in certain cases.

For example, if a "directed rounding" technique or mode is used which rounds in a specific direction (e.g. towards zero, away from zero, towards negative infinity, towards positive infinity) instead of simply to the closest representable number as in a "round to nearest" rounding technique or mode, then instead of determining whether the infinitely precise result is above or below the half way number it is desirable to know whether the infinitely precise result is above, below or equal to the closest representable number in the lower output precision to the calculated result. Accordingly, in these cases instead of identifying the half way number $y_h$ from the calculated result $y_c$, the closest representable number $y_a$ in the lower output precision is identified from the calculated result $y_c$.

In particular, the calculated result $y_c$ will lie between two half way numbers. As described above a half way number is a number in the intermediate precision that lies half way between two consecutive representable numbers in the lower output precision. The closest representable number will be the representable number in the lower output precision that lies between the two half way numbers on either side of the calculated result $y_c$.

If the calculated result is sufficiently accurate to guarantee that the infinitely precise result y will be accurately or correctly rounded to the closest representable number $y_a$ in the lower output precision or the next closest representable number $y_b$ in the lower output precision, where the next closest representable number $y_b$ is the representable number above or below the closest representable number $y_a$ based on the rounding direction; then method 300 of FIG. 3 can be used to determine if the infinitely precise result y is above, below or equal to the closest representable number $y_a$. Generally the calculated result $y_c$ is considered sufficiently accurate when the calculated result $y_c$ is guaranteed to be within $2^{mw+1}$ of the infinitely precise result y.

For round towards zero, the next closest representable number $y_b$ is the next representable number from the closest representable number $y_a$ in the direction of zero; and for round towards positive infinity, the next closest representable number $y_b$ is the next representable number from the closest representable number $y_a$ in the direction of positive infinity.

If the calculated result $y_c$ is sufficiently accurate then once the closest representable number $y_a$ is identified from the calculated result $y_c$ then method 300 of FIG. 3 can be used to determine if the infinitely precise result is above, below or equal to the closest representable number $y_a$ by replacing the half way number $y_h$ with the closest representable number $y_a$. Based on this determination the calculated result $y_c$ in the intermediate precision can be correctly rounded according to the specific rounding technique or mode.

For example, if it is determined that the infinitely precise result y is on the same side of the closest representable number $y_a$ as the next closest representable number $y_b$ then the calculated result may be rounded to the next closest representable number $y_b$. Otherwise, if it is determined that the infinitely precise result y is on the opposite side of the closest representable number $y_a$ compared to the next closest representable number $y_b$ or equal to the closest representable number $y_a$ then the infinitely precise result y may be rounded to the closest representable number $y_a$.

In general the methods (e.g. method 300) and systems (e.g. systems 700 and 800) described herein can be used to identify whether the infinitely precise result y of a reciprocal square root calculation is above, below, or equal to a particular number t so long as the particular number t is sufficiently close to the infinitely precise result y of the reciprocal square root calculation. Generally the particular number t is considered sufficiently close if inequality (30) is satisfied, where ε is the error between the particular number t and the infinitely precise result y.

Where the purpose of the determination is to accurately round a calculated result $y_c$ in the intermediate precision to a lower output precision using a "round to nearest" rounding technique or mode then the particular number t is the half way number $y_h$ indicated by the calculated result $y_c$. Where the purpose of the determination is to accurately round a calculated result $y_c$ in the intermediate precision to a lower output precision using a "directed rounding" technique or mode then the particular number t is the closest representable number $y_a$ indicated by the calculated result $y_c$. Where the determination is for another purpose the particular number t may be another number.

Figure 10:
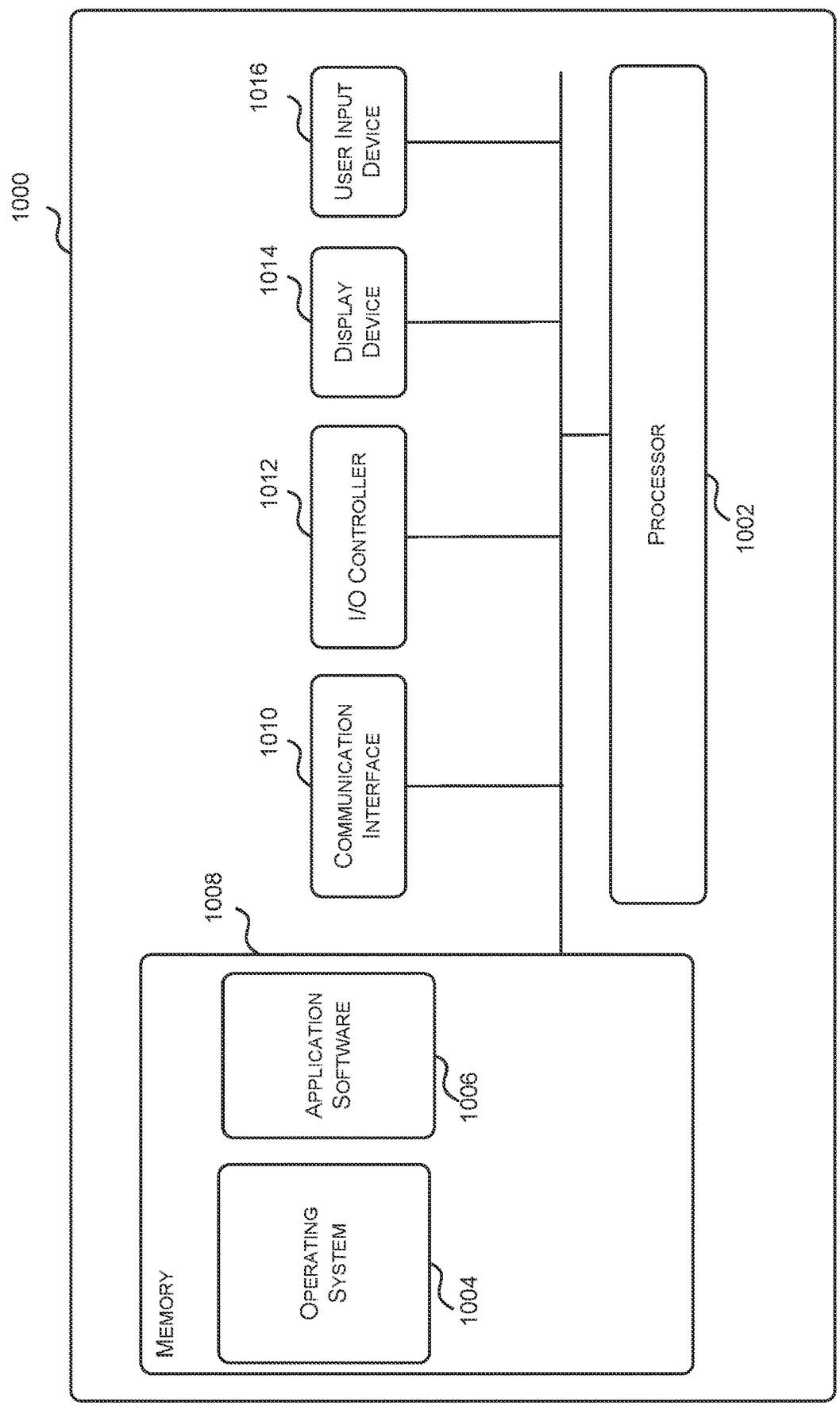
FIG. 10 is an example computing-based device.

FIG. 10 illustrates various components of an exemplary computing-based device 1000 which may be implemented as any form of a computing and/or electronic device, and in which embodiments of the methods and systems described above may be implemented.

Computing-based device 1000 comprises one or more processors 1002 which may be microprocessors, controllers or any other suitable type of processors for processing computer executable instructions to control the operation of the device in order to determine whether the infinitely precise result of a reciprocal square root operation is below or above a half-way number. In some examples, for example where a system on a chip architecture is used, the processors 1002 may include one or more fixed function blocks (also referred to as accelerators) which implement a part of the method of FIG. 3 in hardware (rather than software or firmware). Platform software comprising an operating system 1004 or any other suitable platform software may be provided at the computing-based device to enable application software 1006 to be executed on the device.

The computer executable instructions may be provided using any computer-readable media that is accessible by computing based device 1000. Computer-readable media may include, for example, computer storage media such as memory 1008 and communications media. Computer storage media (i.e. non-transitory machine readable media), such as memory 1008, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1008) is shown within the computing-based device 1000 it will be appreciated that the storage may be distributed or located remotely and accessed via a network or other communication link (e.g. using communication interface 1010).

The computing-based device 1000 also comprises an input/output controller 1012 arranged to output display information to a display device 1014 which may be separate from or integral to the computing-based device 1000. The display information may provide a graphical user interface. The input/output controller 1012 is also arranged to receive and process input from one or more devices, such as a user input device 1016 (e.g. a mouse or a keyboard). In an embodiment the display device 1014 may also act as the user input device 1016 if it is a touch sensitive display device. The input/output controller 1012 may also output data to devices other than the display device, e.g. a locally connected printing device (not shown in FIG. 10).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A system to generate an accurately rounded result of a reciprocal square root calculation performed on an input floating point number, the system comprising:
    a reciprocal square root calculation module configured to generate a calculated result of the reciprocal square root calculation in a first floating point precision;
    a fixed function logic unit configured to determine whether an infinitely precise result of a reciprocal square root operation performed on an input floating point number is greater than, less than, or equal to a particular number in the first floating point precision, the fixed function logic unit comprising:
    one or more fused multiply add hardware logic components configured to:
        (a) calculate a square of the particular number in a second floating point precision that is less than the first floating point precision;
        (b) calculate a rounding error in the calculated square;
        (c) calculate a first delta value in the first floating point precision by calculating the square multiplied by the input floating point number less one; and
        (d) calculate a second delta value in the first floating point precision by calculating the rounding error multiplied by the input floating point number plus the first delta value; and
    an output hardware logic module configured to output an indication of whether the infinitely precise result of the reciprocal square root operation is greater than, less than or equal to the particular number based on a sign of the second delta value; and
    rounding logic configured to round the calculated result to the second floating point precision according to a particular rounding method based on the output indication.

2. The system of claim 1, wherein the rounding logic is configured to, in response to the output indication indicating that the infinitely precise result is greater than the particular number, round the calculated result in one direction; and in response to the output indication indicating that the infinitely precise result is less than the particular number, round the calculated result in another direction.

3. The system of claim 1, wherein the particular rounding method is a round to nearest rounding method so that the rounding logic is configured to, in response to the output indication indicating that the infinitely precise result is greater than the particular number, round up the calculated result; and in response to the output indication indicating that the infinitely precise result is less than the halfway number, round down the calculated result.

4. A method of generating an accurately rounded result of a reciprocal square root calculation performed on an input floating point number, the method comprising:

generating a calculated result of the reciprocal square root calculation in a first floating point precision;
- (a) calculating, at a fused multiply add hardware logic component, a square of the particular number in a second floating point precision that is less than the first floating point precision;
- (b) calculating, at a fused multiply add hardware logic component, a rounding error in the calculated square;
- (c) calculating, at a fused multiply add hardware logic component, a first delta value in the first floating point precision by calculating the square multiplied by the input floating point number less one; and
- (d) calculating, at a fused multiply add hardware logic component, a second delta value in the first floating point precision by calculating the rounding error multiplied by the input floating point number plus the first delta value; and outputting, from an output hardware logic module, an indication of whether the infinitely precise result of the reciprocal square root operation is greater than, less than or equal to the particular number based on a sign of the second delta value; and rounding the calculated result to the second floating point precision according to a particular rounding method based on the output indication.

5. The method of claim 4, wherein rounding the calculated result comprises, in response to the output indication indicating that the infinitely precise result is greater than the particular number, rounding the calculated result in one direction; and in response to the output indication indicating that the infinitely precise result is less than the particular number, rounding the calculated result in another direction.

6. The method of claim 4, wherein the particular rounding method is a round to nearest rounding method so that rounding the calculated result comprises, in response to the output indication indicating that the infinitely precise result is greater than the particular number, rounding up the calculated result; and in response to the output indication indicating that the infinitely precise result is less than the halfway number, rounding down the calculated result.

* * * * *

UNITED STATES PATENT AND TRADEMARK OFFICE
CERTIFICATE OF CORRECTION

PATENT NO. : 11,853,716 B2
APPLICATION NO. : 17/538676
DATED : December 26, 2023
INVENTOR(S) : Casper Van Benthem et al.

It is certified that error appears in the above-identified patent and that said Letters Patent is hereby corrected as shown below:

In the Specification

Column 1, Line 34:
1·mant
Should read as:
-- 1.mant --

Column 6, Line 35:
if is assumed
Should read as:
-- if it is assumed --

Column 10, Line 65:
error, K,
Should read as:
-- error, $\kappa$, --

Column 11, Line 2:
(1 + K)
Should read as:
-- (1 + $\kappa$) --

Column 11, Line 54:
|α|
Should read as:
-- |a| --

Signed and Sealed this
Fourth Day of June, 2024

Katherine Kelly Vidal
*Director of the United States Patent and Trademark Office*